(No Model.)

F. T. WILLIAMS.
INDICATOR FLOAT.

No. 505,619.  Patented Sept. 26, 1893.

WITNESSES.
a. E. Miller
W. E. Smith

Frank Theodore Williams
INVENTOR
BY Geo. L. Cooper
ATTORNEY.

UNITED STATES PATENT OFFICE.

FRANK THEODORE WILLIAMS, OF MERIDEN, CONNECTICUT, ASSIGNOR TO THE EDWARD MILLER & COMPANY, OF SAME PLACE.

INDICATOR-FLOAT.

SPECIFICATION forming part of Letters Patent No. 505,619, dated September 26, 1893.

Application filed March 6, 1893. Serial No. 464,717. (No model.)

*To all whom it may concern:*

Be it known that I, FRANK THEODORE WILLIAMS, a citizen of the United States, residing at Meriden, New Haven county, Connecticut, have invented a new and useful Improvement in Indicator-Floats, of which the following is a specification.

My invention relates to that class of indicator floats used to show the height of liquid in a vessel. It is intended to produce a simple, inexpensive and efficient device to prevent overflowing a lamp or other vessel during the operation of filling.

Figure 1:
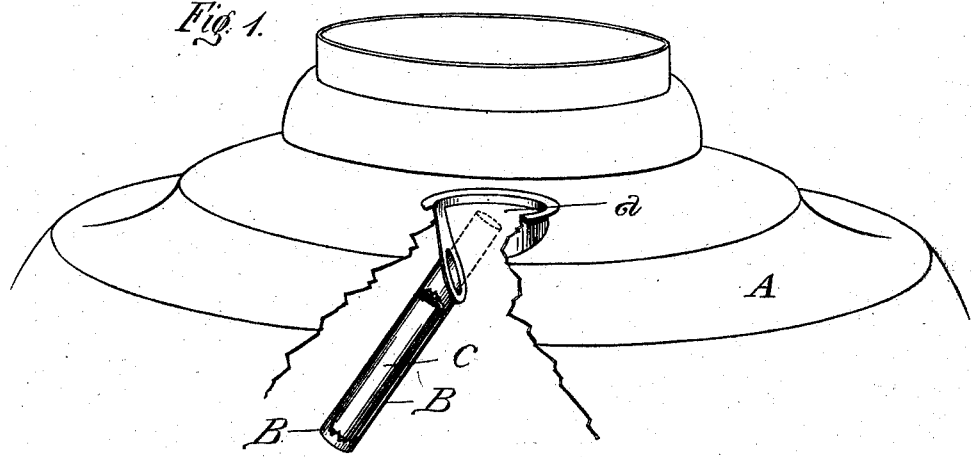
Figure 2:
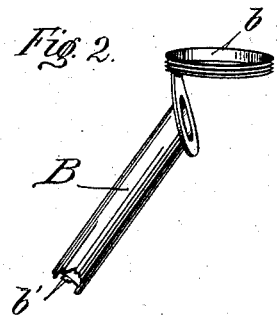
Figure 3:
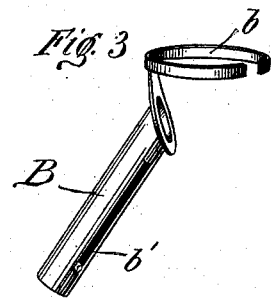
Figure 4:
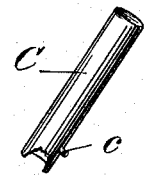

In the accompanying drawings, which represent my device as applicable to a lamp, Figure 1 represents in perspective a lamp fount fitted with my device a part of the fount being broken away to show its operation. Figs. 2 and 3 show modified forms of my device detached from the lamp. Fig. 4 shows a portion of my device separate from the remainder.

The same letters refer to like parts in the several views.

A designates a lamp fount; *a*, an opening in the top of the font A; B, a guide tube; *b*, Figs. 2 and 3, annular portions on the guide B; *b'*, a stop also in the guide B; C, a float; *c*, a lug on the float C.

In the example of my invention illustrated in Fig. 1 of the drawings the lamp fount A may be of any usual or desired form. The opening *a* in the top of the fount A, may be the usual feeder opening through which oil is poured to fill the lamp, or it may if desired be a separate opening. At one side of the opening *a* is attached the upper open end of the guide tube B. The tube extends downward preferably at an angle with the perpendicular as shown. Its lower end is open except for a stop *b'*, clearly shown in Fig. 2, the use of which will presently appear. Within the guide tube B is the float C, which, as shown, consists of a tube closed at its upper, preferably open at its lower, end. It is evident that any body of proper shape and of sufficiently low specific gravity may be used as a float but I much prefer a tube made of thin light metal. It is chiefly to secure lightness that I leave the tube open at its lower end. I prefer to make the tube of aluminum which is of low specific gravity, of light color so as to be easily seen when in use, and practically unaffected by the liquid in which it is immersed so that it neither loses its light color nor sticks in the guide tube.

The operation of my device will be readily seen by examining the drawings. When the lamp is being filled the rising oil enters the guide tube B and raises the float C. The tube B being at an angle with the perpendicular and attached at its upper end at one side of the opening *a*, as shown, is entirely out of the way of the stream of oil or other liquid poured through the opening *a*. The float B rising at an angle is not held down by the force of the stream and is not visible until it is necessary to indicate that the vessel is full or nearly full. It will be noted that the opposite side of the opening *a* forms a stop to prevent the float C rising entirely out of the guide tube B, while the stop *b'* at the lower end of the tube B prevents the float C from dropping out of the lower end of the tube B as the oil is consumed. An open ended tube as shown may be drawn cheaply and finished without soldering or closing any seam so that liability to leakage is avoided. If of aluminum it is so light as to rise freely and show very distinctly.

In Fig. 2 of the drawings I have shown the guide tube B as provided at its upper end with a ring *b* exteriorly screw-threaded to engage with the internal screw-thread usually formed in the feeder opening of a lamp. By this means my device may be applied to lamps now in consumers' hands, a standard size of feeder opening being almost universally employed.

Fig. 3 of the drawings illustrates a device similar to that shown in Fig. 2 except that the annular portion *b* is a resilient split ring adapted by its expansion to frictional adhesion in the feeder or other opening *a*. I have here shown the stop *b'* as a longitudinal slot in which the lug *c* on the float C, shown in Fig. 4, plays as the float rises and falls. This forms an efficient stop to prevent the displacement of the float C in either direction.

It is clearly non-essential to my invention that all the parts of my device be combined as herein shown. And it is evident that mechanical alterations other than those suggested may be made without departing from my invention. Although I have spoken of my device in connection with a lamp it is of course equally applicable to other receptacles for liquids.

What I claim as my invention, and desire to secure by Letters Patent of the United States, is as follows:

1. In a liquid receptacle having an orifice at or near its top in combination, a float, a lug on said float, a guide tube for said float secured within said receptacle at an angle with the perpendicular so that its upper end is at one side of said orifice and a longitudinal slot in said guide tube adapted to receive said lug on said float, substantially as described.

2. In a liquid receptacle having an orifice at or near its top in combination, a collar surrounding said orifice, a float, a guide for said float and a ring of adjustable diameter secured to the upper end of said guide and adapted to be removably secured within said collar, substantially as described.

3. In a liquid receptacle in combination a feeder opening, a float and a guide for said float at an angle with the perpendicular, said guide being entirely at one side of said feeder opening and with its upper end adjacent thereto, substantially as described.

4. In a liquid receptacle in combination a feeder opening, a float and a guide for said float at an angle with the perpendicular, the upper end of said guide being detachably secured to the margin of said feeder opening, substantially as described.

FRANK THEODORE WILLIAMS.

Witnesses:
GEO. L. COOPER,
NORMAN E. SMITH.